Nov. 28, 1950     W. D. LEWIS     2,531,447
HYBRID CHANNEL-BRANCHING MICROWAVE FILTER
Filed Dec. 5, 1947     6 Sheets-Sheet 1
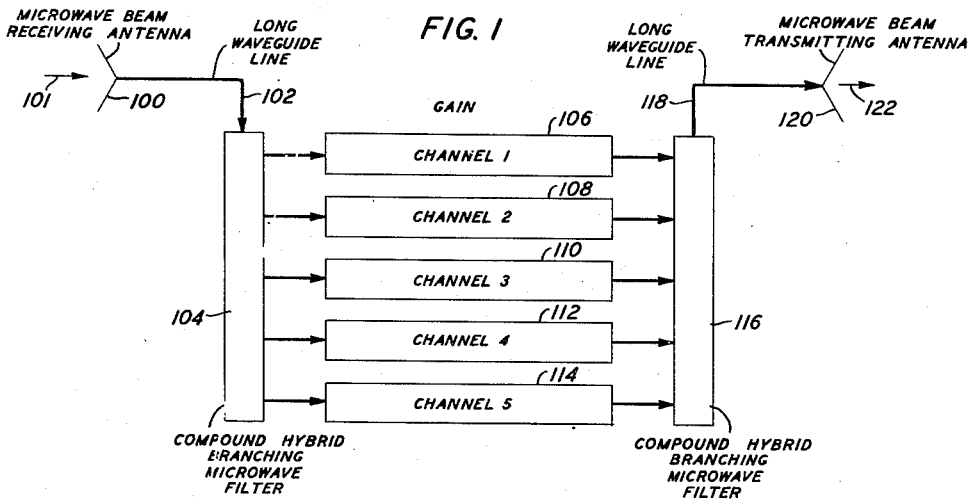
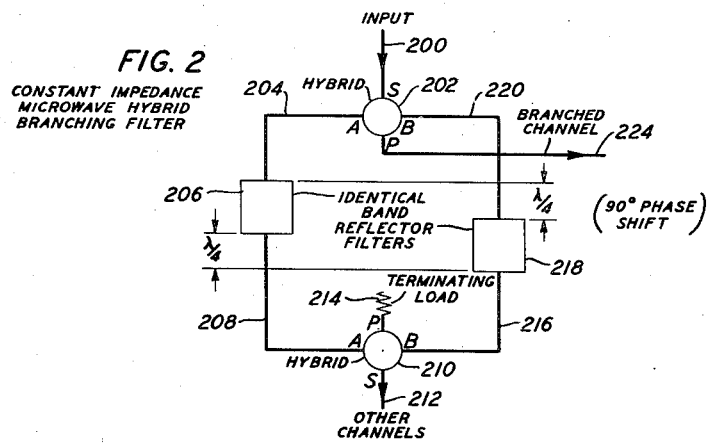
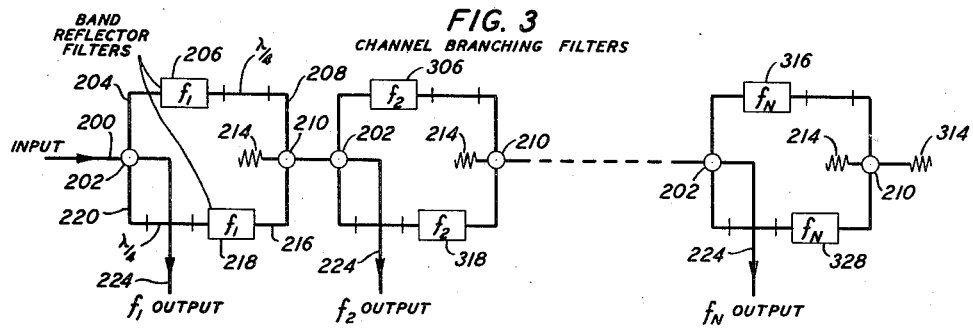
INVENTOR
W. D. LEWIS
BY
H. O. Wright
ATTORNEY Nov. 28, 1950      W. D. LEWIS      2,531,447
HYBRID CHANNEL-BRANCHING MICROWAVE FILTER
Filed Dec. 5, 1947      6 Sheets-Sheet 2
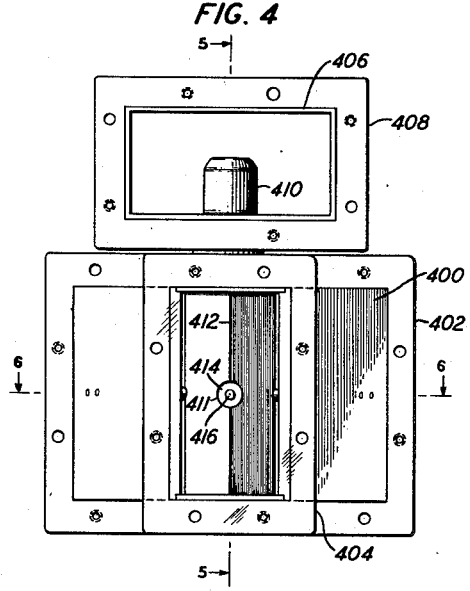
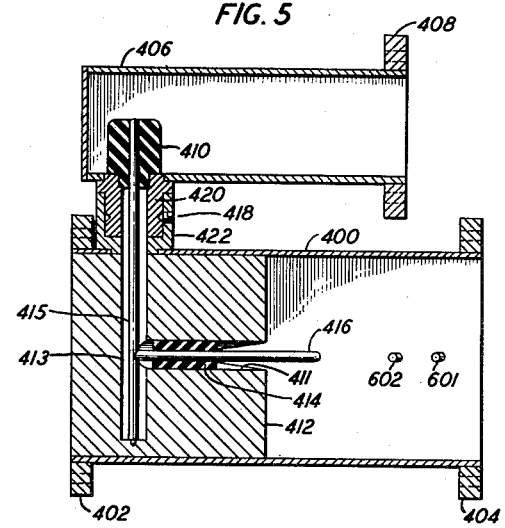
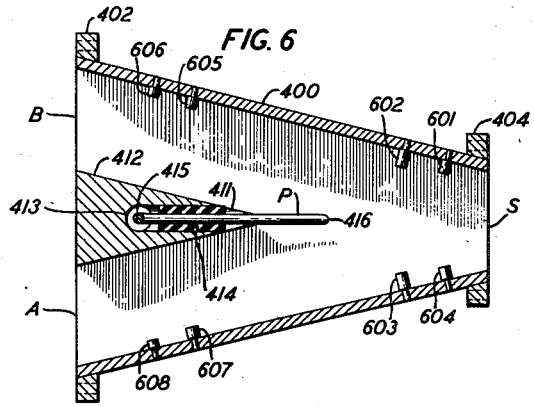
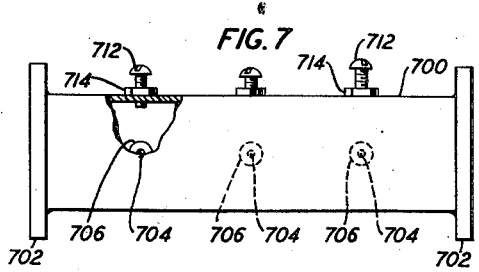
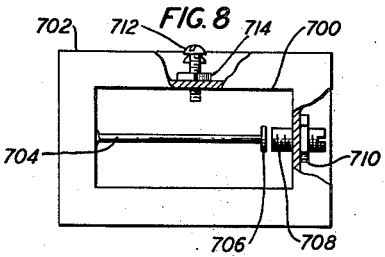
INVENTOR
W. D. LEWIS
BY
H. O. Wright
ATTORNEY Nov. 28, 1950 W. D. LEWIS 2,531,447
HYBRID CHANNEL-BRANCHING MICROWAVE FILTER
Filed Dec. 5, 1947 6 Sheets-Sheet 3

INVENTOR
W. D. LEWIS
BY
H. O. Wright
ATTORNEY

Nov. 28, 1950     W. D. LEWIS     2,531,447
HYBRID CHANNEL-BRANCHING MICROWAVE FILTER

Filed Dec. 5, 1947     6 Sheets-Sheet 4

INVENTOR
W. D. LEWIS
BY
H. O. Wright
ATTORNEY

Nov. 28, 1950 — W. D. LEWIS — 2,531,447
HYBRID CHANNEL-BRANCHING MICROWAVE FILTER
Filed Dec. 5, 1947 — 6 Sheets-Sheet 5

INVENTOR
W. D. LEWIS
BY
H. O. Wright
ATTORNEY

Nov. 28, 1950     W. D. LEWIS     2,531,447
HYBRID CHANNEL-BRANCHING MICROWAVE FILTER
Filed Dec. 5, 1947     6 Sheets-Sheet 6

INVENTOR
W. D. LEWIS
BY
H. O. Wright
ATTORNEY

Patented Nov. 28, 1950

2,531,447

UNITED STATES PATENT OFFICE 2,531,447

HYBRID CHANNEL-BRANCHING MICROWAVE FILTER

Willard D. Lewis, Little Silver, N. J., assignor to Bell Telephone Laboratories, Incorporated, New York, N. Y., a corporation of New York Application December 5, 1947, Serial No. 789,985

11 Claims. (Cl. 178—44)

This invention relates to multichannel high frequency, ultra-high frequency and microwave radio communication systems and the like. More particularly it relates to methods of and apparatus for effecting the segregation and the re-combining of the channels of multichannel, high frequency, ultra-high frequency and microwave transmission line and radio communication systems, at repeater or relay stations, to facilitate the amplification and retransmission of the channels to the next successive repeater station and to facilitate the isolation of each of the channels at terminal stations, as required in the normal operation of such systems.

A principal object of the invention is to provide convenient and practicable methods and apparatus for segregating or "branching" the channels of multichannel high frequency, ultra-high frequency and microwave communication systems at repeater (relay) and terminal stations of the system.

A further object is to provide high frequency, ultra-high frequency and microwave channel segregating or branching circuits which will introduce very little energy dissipation.

Another object is to provide segregating or branching circuits, of the above-mentioned type, which will present a substantially constant resistive impedance over the entire frequency region of interest.

The frequency region of particular interest in connection with this application includes that in which the use of coaxial lines and/or wave guides is preferable to the use of paired wire transmission lines. It will be obvious to those skilled in the art, however, that many of the principles of the present invention are universally applicable to all frequency ranges.

A still further object of the invention is to provide segregating or branching circuits which eliminate the reflection of energy back to the source of the multichannel energy.

Other and further objects will appear during the course of the following description of specific preferred embodiments of the invention and from the appended claims.

With the trend toward ever-increasing frequency and particularly since the advent of sources of adequate microwave radio energy, i. e. radio energy having frequencies above 1000 megacycles, it has become increasingly convenient, and at times imperative, to depart more and more radically from approximate equivalents of the lumped element type of frequency selective circuits. These latter circuits, of course, comprise various combinations of discrete inductive, capacitative and resistive elements, proportioned and arranged in accordance with well-known highly developed, coordinated and systematized principles. By way of illustration, many of these principles are summarized and briefly discussed in the "Radio Engineer's Handbook" by F. E. Terman, first edition, McGraw-Hill Book Company, Inc. New York city, 1943, pages 197 to 251, inclusive. The principles, however, did not spring full grown from the brain of some supernatural being but were evolved, over a period of several decades, slowly and piecemeal. Progress is still being made toward broader concepts and more nearly ideal structures.

Substantial portions of the progress made in the development of lumped element structures resulted from a process of reasoning by analogy, whereby various combinations of lumped electrical elements were recognized as having characteristics closely analogous to characteristics well known to be possessed by mechanically or acoustically vibratory systems. Concurrently with the advance in knowledge of electrical lumped element structures, it was frequently possible to greatly improve the older mechanical and acoustical structures by reversing the process and transferring by analogy, principles of electrical networks newly discovered, to structures of the older arts.

Much progress has been made, particularly during the recent war, in the high, ultra-high and microwave frequency regions. To a considerable extent this progress has also resulted from an extensive use of the process of reasoning by analogy.

In the case of the present invention various novel high frequency, ultra-high frequency and microwave structures are disclosed in the application which, though vastly different in physical appearance and structure from the lower frequency lumped element structures, can best be understood by keeping in mind the somewhat analogous structures (from an electrical circuit viewpoint) employed in the lower frequency regions.

In particular, the characteristics of the time-honored "hybrid-coil," used for decades in voice frequency telephony, can be identified as being closely analogous to those of the "magic T" or other "hybrid" high frequency, ultra-high frequency and microwave coaxial line and wave guide structures. Reasoning by analogy, the "hybrid-coil" taken with its terminating impedances has many characteristics similar to those of the likewise time-honored Wheatstone bridge and the Wheatstone bridge is merely a simple form of lattice structure. The lattice structure, in turn, is recognized as one of the most general types of lumped element electrical networks and can readily be designed in accordance with principles, universally known in the art, to provide virtually any physically realizable impedance, phase and attenuation characteristics which may be desired. See, for example, the papers entitled "A General Theory of Electric Wave Filters" by H. W. Bode, published in the Massachusetts Institute of Technology Journal of Mathematics and Physics, November 1934 and "Ideal Wave Filters" by H. W. Bode and R. L. Dietzold published in the Bell System Technical Journal, volume XIV, No. 2 April 1935 at page 215.

Having arrived at the presumption that some kind of "kinship" probably existed between high frequency, ultra-high frequency and microwave "hybrid" structures and the lattice type of lumped element, lower frequency, electrical network, the next step was to design structures with this presumption in mind. By this approach structures which will function at high, ultra-high and microwave frequencies in analogous manner to that of the well-known lumped element lattice structures at much lower frequencies have been evolved. A key is thereby provided to a whole gamut of high frequency, ultra-high frequency and microwave equivalents of the lower frequency lumped element lattice type structures. Such structures are described in detail and claimed in the copending application of D. H. Ring, Serial No. 68,361, filed December 30, 1948, assigned to applicant's assignee.

The "hybrid" branching filter units of the present invention have been so designated, since they employ pairs of high frequency, ultra-high frequency or microwave structures having characteristics closely resembling those of the well-known hybrid coil of voice and ordinary carrier frequency communication circuits, connected together by means of circuits including high frequency, ultra-high frequency or microwave filters, or, alternatively, phase discriminative structures, to effect the segregation or "filtering out" or "branching off" of the various frequency channels of a multichannel high frequency, ultra-high frequency or microwave communication system. A specifically different form of hybrid branching filter unit is disclosed and claimed in the copending application of A. G. Fox, Serial No. 789,812, filed December 5, 1947, and assigned to applicant's assignee. These rather complex units are preferred in very high frequency circuits to the more simple straightforward filtering structures available, at present, at very high frequencies, because the hybrid structure terminations present a substantially constant resistive impedance over the entire frequency range being used. They thus substantially eliminate troublesome problems which would be encountered because of reflected energy and interaction between associated units if it were attempted to connect a number of the simpler filtering structures directly in series, or in parallel, to effect the desired segregation of the channels.

The principles of the invention will become more clearly apparent during the course of the following detailed description of preferred illustrative embodiment of the invention, in conjunction with the accompanying drawings in which:

Fig. 1 illustrates, in block schematic diagram form, an arrangement of apparatus, including compound or composite "hybrid branching ultra-high frequency or microwave filters" of the present invention, suitable for use at a repeater station in a five-channel ultra-high frequency or microwave radio communication system;

Fig. 2 illustrates, in block schematic diagram form, the circuital arrangement of apparatus within a unit "hybrid" branching filter suitable for use as part of the compound or composite branching filters of Fig. 1;

Fig. 3 illustrates, in schematic diagram form, a serially arranged chain, or tandem arrangement, of a plurality of unit filters such as that illustrated in Fig. 2, adapted to segregate, or branch off, each channel of a system having $n$ channels, where $n$ is any whole number;

Figs. 4, 5 and 6 are three views of a wave guide "hybrid" junction adapted particularly well for use in a specific form of "hybrid" branching filter of the invention, Fig. 4 being an end view, Fig. 5 being a view of a vertical cross-section and Fig. 6 being a view of a horizontal cross-section of the hybrid junction;

Figs. 7 and 8 are side and end views, respectively, of a novel type of brand reflection wave guide filter suitable for use in a specific form of the unit of Fig. 2;

Figure 9:
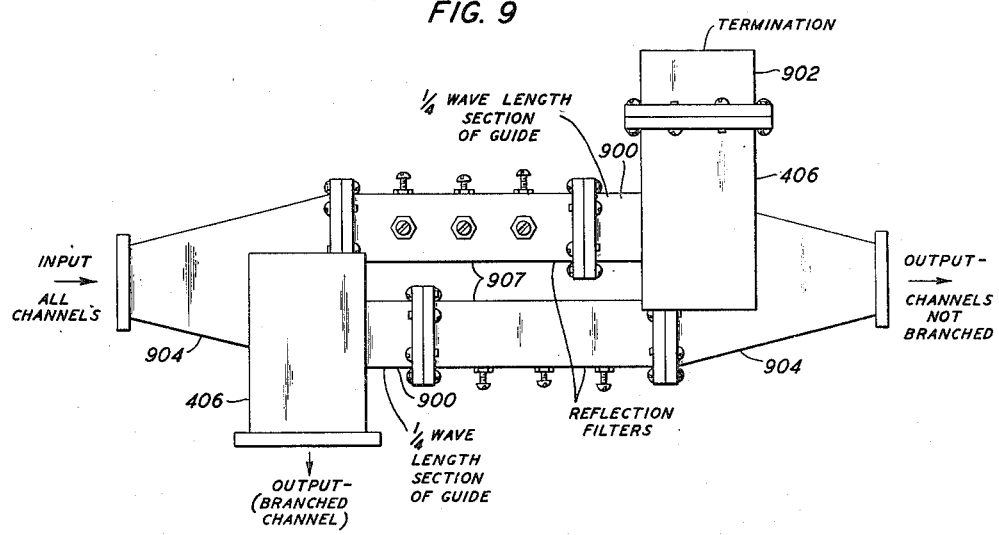
Fig. 9 shows the physical structure of a specific form of microwave hybrid branching filter unit of the general type indicated by the schematic diagram of Fig. 2.

In more detail in Fig. 1 antenna 100 represents a highly directive, beam type, ultra-high frequency, or microwave, radio antenna receiving a radio signal 101, covering a range of ultra-high or microwave frequencies sufficiently wide that, by way of example, five communication channels can conveniently be included therein.

As a specific illustrative example, a microwave range extending from 3700 to 4200 megacycles, inclusive, with five communication channels 20 megacycles wide, the mid-band frequencies of successive channels being spaced 80 megacycles apart, located therein, has been found convenient and practicable. The mid-band frequencies of these five channels are, in the specific example, 3870, 3950, 4030, 4110 and 4190 megacycles, respectively. Antennas 100 and 120 can be any suitable type of highly directive beam antenna, for example, paraboloidal beam type antenna, or alternatively they can be antennas of the general type disclosed and described in the copending application of W. E. Kock, Serial No. 748,448, filed May 16, 1947, assigned to applicant's assignee.

The range of frequencies received by antenna 100 is transmitted by wave guide 102 to the compound or composite "hybrid branching microwave filter" 104.

The cut-off of the wave guide should be well below the lowest frequency to be transmitted, to avoid the introduction of substantial and non-uniform attenuation in the wave guide as well as to avoid introducing disturbing impedance and phase components. As is a common and convenient practice in the art, wave guides of rectangular cross-section having one dimension larger than the other will preferably be employed in the illustrative structures shown in the drawings. A simple mode of wave, defined in the reference to Schelkunoff's book cited below, will also be employed. The shorter dimension of the guide will be referred to as the E-plane dimension. The longer dimension will be referred to as the H-plane dimension. However the principles of the inventions can readily be applied to systems and arrangements using square or round guides as will be readily apparent to those skilled in the art. By way of example, for the frequency range above mentioned a rectangular wave guide having a height of 2.990 inches (H-plane) and a width of 1.145 inches (E-plane) internal dimensions, was found suitable. The cut-off of this wave guide is approximately 2600 megacycles.

In the wave guide structures employed below for illustrative purposes, fundamental mode waves $E_{1,0}$ (see page 316 of "Electromagnetic Waves" by S. A. Schelkunoff, published by D. Van Nostrand Company, Inc., New York city, 1943) are to be understood as being employed in the operation of the structures, the electric vector being parallel to the shorter sides of the guide.

It is also to be understood that, throughout the application, drawings and claims, when specific lengths of wave guide structures are mentioned in terms of a portion of a wavelength, the wavelength of a particular frequency when being transmitted through the guide structure is intended. Usually the median frequency of the frequency range or of a particular channel or band of frequencies is employed to provide the "yardstick" wavelength in specific instances.

The characteristics and components of a suitable "filter" 104 will be discussed hereinafter in detail, in connection with Figs. 2 to 8, inclusive. It will suffice here to state, simply, that it functions to segregate each of the five above-mentioned communication channels so that, for example, frequencies in the band having its mid-frequency at 3870 megacycles will alone be transmitted to gain channel 106, the band centered about 3950 megacycles will alone be transmitted to gain channel 108, the band centered about 4030 megacycles will alone be transmitted to gain channel 110, the band centered about 4110 megacycles will alone be transmitted to gain channel 112 and the band centered about 4190 megacycles will alone be transmitted to gain channel 114.

In the gain channels 106, 108, 110, 112 and 114, the input frequencies are demodulated to obtain a convenient intermediate range of frequencies, (for example, to 65 megacycles ±10 megacycles) appropriately amplified, reconverted to their original microwave frequencies and passed through a second compound or composite hybrid branching microwave filter 116, through a second wave guide 118 to a transmitting antenna 120 which radiates them in the form of a highly directive radio beam 122, to impinge upon a distant receiving antenna at a successive repeater station or at a receiving terminal of the system.

Filter 116, wave guide 118 and antenna 120 can be substantially identical with filter 104, wave guide 102 and antenna 100, respectively, as described above.

The gain channels 106, 108, 110, 112 and 114 can be any of numerous forms of combinations of demodulating, amplifying and modulating apparatus well known to those skilled in the microwave art and are not an essential part of the devices, i. e., the "hybrid" branching filters, etc., with which the present application is primarily concerned. They are thus briefly mentioned and the overall block schematic of a microwave repeater is given in Fig. 1 to assist those skilled in the art in comprehending one method of employing the "hybrid" branching filters of the present invention. Throughout such a microwave system, wave guide transmission lines of appropriate dimensions are preferably employed to convey the microwave energy, while coaxial or parallel paired wire transmission lines can, of course, be more conveniently used, or will be required, as is well known in the art, for lower frequency energy. Occasionally coaxial line structures will be employed at microwave frequencies.

In Fig. 2 one form of a unit "hybrid" branching filter is indicated in block schematic diagram form. For a microwave system, transmission lines 200, 204, 208, 212, 216, 220 and 224 are preferably wave guides of appropriate dimensions, such as those described above. Alternatively, for high or ultra-high frequencies, coaxial lines could be conveniently employed in accordance with principles well known in the art. "Hybrids" 202 and 210 can be structures of the so-called "magic T" (wave guide junction) or "rat-race" (wave guide, coaxial or other transmission line loop structures) types, numerous forms of which are illustrated and described, for example, in the copending application of W. A. Tyrrell, Serial No. 470,810, filed December 31, 1942, which has matured into United States Patent 2,445,895, granted July 27, 1948. An improved type of microwave hybrid junction, intended particularly for use with the hybrid branching filters of this invention, is shown in detail in Figs. 4 to 6, inclusive, of the accompanying drawings and completely described hereinunder.

Whatever form of "hybrid" structure is employed it should have four terminations, associated in two pairs, each termination of a pair being conjugately related to the other termination of the same pair.

For the two terminations comprising at least one pair, for convenience here designated the first pair, one termination should be a "parallel" connection to the second pair and the other should be a "series" connection to the second pair. The terminations of the "first" pair will be designated P and S, respectively, and the terminations of the "second" pair will be designated A and B, respectively, throughout the following description and in figures of the drawings showing hybrid junctions. Furthermore, the inherent properties of a hybrid structure require that if voltage wave energy is introduced into the structure from or by way of either termination of the first pair no energy will leave the structure by way of the other termination of that pair, but the energy introduced will divide equally between the other pair of terminations A and B of the hybrid structure.

The voltage waves representing the halves of the energy in each of the second pair of terminations A and B will be in phase, if the energy is introduced by way of the "parallel" connected termination P of the first pair, or 180 degrees out of phase if it is introduced by way of the "series" connected termination S of the first pair. This simply means that the two conjugate pairs are so related electrically that one termination P of the first pair is effectively electrically in parallel with the termination A and B of the second pair, while the second termination S of the first pair is effectively electrically in series with the terminations A and B of the second pair.

Conversely, if equal voltage wave energies are introduced in phase into the hybrid junction by way of the two terminations A and B of the second pair they will combine in the parallel connected termination P of the first pair, no voltage wave energy being transmitted to the series connected termination S.

If equal voltage wave energies 180 degrees out of phase are introduced into the microwave hybrid junction by way of the two terminations A and B of the second pair, the voltage wave energies will combine in the series connected termination S of the first pair, no voltage wave energy being transmitted to the parallel connected termination P. Obviously, any multiple of 360 degrees phase difference can be added to the "in phase" or "out of phase" conditions just described above without affecting the termination (P or S, respectively) in which the energies, applied to terminations A and B will combine. The matter of additional whole cycles (i. e. 360 degree phase differences) is treated in more detail in connection with the structure of Fig. 10, described at length hereinafter. It is also obvious that when equal energies are introduced into the A and B terminations changing the phase of the energy introduced into one only of the A and B terminations by 180 degrees will cause the combined energy to appear in the opposite one of the terminations P or S, in which it would have appeared without such a change. As applied to the circuit of Fig. 2, this means that the voltage wave energy (comprising, for example, all of the five channels of Fig. 1) entering the S termination of hybrid structure 202 by transmission line 200, will divide equally at all frequencies between transmission lines 204 and 220, the two portions leaving hybrid terminations A and B, being 180 degrees out of phase with respect to each other.

The hybrid structures 202 and 210 are arranged in Fig. 2 with the "second pair" of terminations A and B horizontally oriented, as shown, in each structure. The transmission lines 204 and 220 are of identical construction, but line 220 is the longer by substantially one-quarter wavelength of the median frequency of the frequency range of the channel to be segregated or branched.

Identical band, or channel, reflection filters 206 and 218 are designed to reflect, for example, frequencies within one of the channels of Fig. 1.

Assuming this hybrid branching filter is to segregate or branch off the lowest of the five channels suggested for the system of Fig. 1, then filters 206 and 218 would reflect all frequencies between 3860 and 3880 megacycles, inclusive, which fall within that channel, and would freely pass the remaining four of the five channels. The reflected channel of frequencies, above described, would return to hybrid structure 202, equal amounts of voltage wave energy being reflected back through transmission lines 204 and 220.

However, the reflected voltage wave energies in the two lines will be an additional 180 degrees out of phase with respect to their original phase relation when first leaving hybrid structure 202, since the voltage waves traversing line 220 have twice traversed a path one-quarter wavelength longer than the path traversed by the voltage waves reflected back through line 204.

From the inherent properties of hybrid structures, described in detail above, the reflected voltage waves will not appear in input transmission line 200 but will combine in output transmission line 224 (since it is connected to the conjugate, or P, termination of the "first" pair of terminations including the input, or S, termination to which line 200 connects.

The "half-energy" portions of the voltage waves of the remaining four channels of the system of Fig. 1 will pass freely through filters 206 and 218 respectively, and then through transmission lines 208 and 216, respectively, to the output hybrid structure 210. Transmission lines 208 and 216 are identical except that line 208 is substantially one-quarter wavelength of the median frequency of the channel to be branched, longer than line 216. From inspection it is obvious that the voltage waves of these remaining four channels will arrive at hybrid structure 210 without change in their relative phase relations, in which event they will combine and pass out a particular termination (S) of the opposite pair of conjugate terminations of the hybrid structure, i. e., the termination to which line 212 is connected. The conjugate termination to this is connected to a terminating load 214 which matches the impedance looking into the hybrid structure at its connecting termination and thus preserves the balance of the hybrid structure.

It is of course obvious, that if the energy is originally introduced into the series-connected (S) termination of hybrid structure 202, and no change in the relative phase of the half-energies is introduced in passing to hybrid structure 210, the half-energies will recombine in the series-connected (S) termination of hybrid structure

210. Likewise if introduced into termination P of structure 202 and passed without change in relative phase, the half-energies will combine in termination P of 210.

Filters 206 and 218 can be of the type illustrated in Figs. 7 and 8 and described in detail hereinunder, or alternatively, they can be of the type comprising an additional hybrid structure with reactive termination impedances connected to one pair of conjugate arms proportioned to reflect the proper channel of frequencies and to freely pass the other channels.

Figure 10:
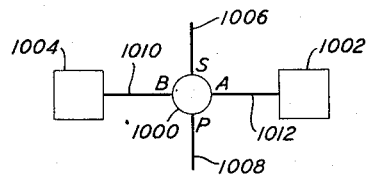
Fig. 10 shows, in block schematic diagram form, a combination of a hybrid coil and two reactances which can be made substantially equivalent at very high frequencies to any form of filter and/or all pass network realizable at low frequencies by the lattice type of lumped element structure.

Various forms of this latter type of filter structure are illustrated by Fig. 10 and other figures associated with Fig. 10 as will also be described in detail hereinunder. A more comprehensive description of such structures is given in the copending application of D. H. Ring mentioned above.

In Fig. 3 the method of connecting a plurality of hybrid branching filter unit circuits, of the type illustrated and described in detail above in connection with Fig. 2, is shown.

All unit circuits of Fig. 3 can be identically similar to that of Fig. 2 except that the band or channel reflecting filters 206, 218; 306, 318 and 316, 328, respectively, are designed to reflect the successive single bands or channels of the system, so that one channel is branched off at each unit circuit and the remaining unbranched channels pass on to successive unit circuits until all channels have thus been individually branched off. The extra quarter wavelength of lines 229 and 208 or corresponding lines of successive unit branching circuits, will, of course, be based on the median frequency of the channel being branched in each instance. The order in which the channels are branched off can be arbitrarily chosen and need not be in order of increasing frequency bands, as illustrated.

In case the total number of channels (*n*) is five, as assumed by way of example above, then there will preferably be five unit circuits connected in tandem in the manner illustrated in Fig. 3 and, by way of example, channels each 20 megacycles wide and centered about the frequencies 3870, 3950, 4030, 4110 and 4190, respectively, will be branched off consecutively, the last unit branching circuit being terminated in an impedance termination 314 proportioned to match the impedance looking into the hybrid structure termination to which it is connected. The entire group of five unit branching circuits connected as illustrated in Fig. 3 can, by way of example, then be used as the compound or composite hybrid branching microwave filter 104, or 116, of Fig. 1.

It is possible, in some instances, to dispense with the last of the unit branching circuits and to take the last channel (the fifth channel in the above illustration) from the output termination at the second hybrid structure of the next-to-last (fourth) unit. However, in many cases it will be found that objectionable interchannel "noise" will be present at this output termination and the use of a fifth unit will therefore be desirable.

In Figs. 4, 5 and 6 is shown a form of ultra-high frequency and microwave hybrid structure which is peculiarly well adapted for use in the hybrid branching filter unit circuits of the type shown in Figs. 2 and 3 and described in detail above. This structure is the joint invention of applicant and two others, namely, H. T. Friis and L. C. Tillotson. It is described in detail and claimed in a joint application of the three parties, Serial No. 789,850, filed December 5, 1947, assigned to applicant's assignee.

Fig. 4 is an end view, looking at the smaller end of the truncated V-shaped member, designated by the numeral 400 in all three figures. Fig. 5 is a vertical cross-sectional view along the line 5—5 shown in Fig. 4, the structure being completely symmetrical laterally about this line when the longitudinal axis of member 406 is parallel with the longitudinal axis of member 400. Fig. 6 is a horizontal cross-sectional view looking down from the line 6—6 of Fig. 4. Like parts are given like designation numbers where they are shown in two or more of the three figures.

The structure of Figs. 4, 5 and 6 is similar to the structure shown in Fig. 31 of the above-mentioned application of W. A. Tyrrell, but it has been extensively modified in form to introduce impedance transformations and to substantially eliminate the appreciable impedance irregularities arising from abrupt changes in the direction of the energy paths of prior art structures of this general type.

The form of member 400 can most easily be understood if it be looked upon as an E-plane junction of two wave guides placed so that their longitudinal axes intersect at an angle of approximately 20 degrees in a common horizontal plane, the H planes of both guides being vertical, the dimensions of both guides in both planes being, respectively, identical. For the system and frequency range given above, by way of example, guides having an H-plane dimension of 2.290 inches and an E-plane dimension of 1.145 inches have been found satisfactory. For member 400, therefore, the single opening at the smaller end and the two openings at the larger end, all have the same H-plane (vertical) dimension of 2.290 inches and the same E-plane (horizontal) dimension of 1.145 inches. A small V-shaped member 412 forms the inner vertical surfaces of the two guides from the larger end of member 400 to their line of intersection, which intersection should be at a distance of substantially one-half wavelength, of the median frequency of the frequency range to be employed, from the smaller end of member 400. Member 412 can, alternatively, be an open V-shaped member formed by the junction of the inner sides of the two arms of the structure 400. The "throat section" of member 400, i. e. the portion between the apex of member 412 and the small end of member 400, constitutes a 2 to 1 impedance transforming section and thus substantially matches the impedance of the single orifice at the small end of member 400 to the combined impedances of the two orifices at the larger end. This arrangement has the further desirable feature that the impedance of all three orifices are the same.

The horizontal dimension, or width, of member 400 at the position of this line of intersection should, obviously, be substantially twice the E-plane dimension of the two like wave guides considered as converging on each other to form member 400. A flange 404 is provided at the smaller end of member 400 and a second flange 402 is provided at the larger end of member 400 to facilitate the joining of wave guides having the above described dimensions 2.290 inches (H-plane) and 1.145 inches (E-plane) at the three wave guide orifices of member 400. In view of the transforming action of the throat section, described above, the impedances of all three orifices are identical, as mentioned above, and therefore, transmission lines (wave guides) of the same impedance can be connected to all three orifices.

Provision is made for connecting a fourth wave guide of like dimensions (or of different dimensions should it be desired) to the junction by a coaxial-line type of coupling built into the smaller centrally located V-shaped member 412.

A vertical cylindrical passage 413 and a horizontal cylindrical passage 411, the latter, centered vertically and perpendicular to the opposite base of member 412, are formed in member 412 as shown in the cross-sectional view of Fig. 5 and constitute the inner surfaces of the outer conductors of the coaxial line coupling. Cylindrical conductors 415 and 416 are the inner conductors of the coaxial line coupling and are centered in the cylindrical passages 413 and 411, respectively, by insulating bushings 410 and 414, respectively. These bushings can be of polystyrene.

The lower end of inner conductor 415 is conductively fastened centrally to the lower (closed) end of passage 413 and the left end of inner conductor 416 conductively connects to conductor 415 at a point approximately one-quarter wavelength, of the median frequency of the frequency range employed, from the lower end. The short-circuit at the lower end of the vertical bit of coaxial line is transformed by the one-quarter wavelength coaxial line, just described, so that the impedance at the point of connection of 416 to 415 is relatively high, i. e., approximating that of an open circuit. The upper end of member 415 extends sufficiently into the section of wave guide 406 to afford an effective broad-band coupling therewith. The end of member 406 nearer the coaxial coupling is closed, as shown clearly in Fig. 5, and the coaxial coupling member 415 is located on the longitudinal center line of member 406 at a distance of approximately an eighth wavelength from the closed end of member 406. By means of a housing member 422 affixed to member 400 and a bushing 420 affixed to member 406, the latter can be rotated about the vertical center line of member 415 and can be fixed at any angle by tightening set screw 418, which registers with a small groove in the side of bushing 420.

The open end of member 406 is provided with a flange 408 to facilitate coupling to another wave guide transmission line or to a terminating device of suitable impedance. The coaxial coupling arrangement just described can be proportioned to introduce, within wide limits, any desired impedance transformation. The actual design employed, as just described, introduces a 2 to 1 impedance transformation so that a wave guide transmission line or terminating impedance of the same impedance as the lines connecting to orifices S, A and B can be connected to the open end of member 406 without introducing any impedance irregularity. The internal dimensions of member 406 can be those of the wave guides to which member 400 is also adapted to be connected, i. e., in the illustrative example above suggested, 2.290 inches (H-plane) and 1.145 inches (E-plane). Alternatively member 406 can be adapted to connect to any other size or shape of wave guide or to a coaxial line, if so desired.

Minor impedance irregularities can be eliminated by inserting small pins 601 to 608 inclusive in the sides of member 400 spaced along the center line of their respective sides by approximately one-eighth wavelength of the median frequency of the frequency range employed. In many instances these can be omitted and in most cases only four, such as 601 to 604, inclusive, near the smaller end of member 400 will be found entirely sufficient. They function by virtue of the compensating small impedance irregularities they add to the electrical path.

Member 416 extends approximately 0.4 wavelength, of the median frequency employed, to the right of the right end of insulating member 414, and being positioned along the longitudinal axis of member 400, in the "throat" section thereof, as shown it constitutes a "parallel" coupling to the two arms of the truncated V-shaped member 400. Because of the symmetry of the arrangement, the coupling afforded by member 416 and the associated coaxial coupling described in detail above, is conjugate with respect to the "series" coupling, which the opening at the small end of member 400 affords to the two arms of the larger end of member 400.

To summarize, the device illustrated in Figs. 4, 5 and 6 is a "hybrid" microwave junction device in which the terminations A and B (Fig. 6) are conjugately related and terminations S and P (Fig. 6) are also conjugately related, S being connected effectively in series relation to A and B, and P being connected effectively in parallel relation to A and B. This means that with the other three arms properly terminated, energy introduced into S or P will not appear in its conjugately related termination (P or S, respectively) but will divide equally between the other two terminations A and B. If P were employed as the input termination, since it has effectively a "parallel" connection with the two output terminations A and B, the portions (halves) of the power (voltage waves) transmitted to them will travel away from the junction in phase, whereas, if, as will usually be the case, S is employed as the input termination, since it has effectively a "series" connection to A and B, the equal portions of the power (voltage waves) leaving the junction in the two output terminations will be precisely opposed in phase. In each instance, reciprocal relations exist, i. e., if equal powers (voltage waves) are introduced in phase into the A and B terminations of the device, the powers (voltage waves) will combine in the P termination and if equal powers (voltage waves) are introduced 180 degrees out of phase into the A and B terminations the powers (voltage waves) will combine in the S termination.

From the above it is obvious that the devices of Figs. 4, 5 and 6 will function as described for the hybrid devices 202 and 210 of Figs. 2 and 3. The arrangement of Figs. 4, 5 and 6 is peculiarly well adapted for use in circuits of the type illustrated in Figs. 2 and 3, when reflection filters of the type illustrated by Figs. 7 and 8 (or other wave guide type filters as described hereinunder) are also employed, since the two electrically parallel paths containing the reflection filters can connect to terminations A and B (Fig. 6) and the branched channel 224 or the impedance termination 214 can connect to termination P by way of member 406 (Fig. 5) and the coaxial coupling. An example of this convenient structural combination is shown in Fig. 9 and will be described in detail below.

Where termination P is to be directly connected to an impedance termination, member 406 can be replaced by a suitable termination connected directly to the coaxial line at the upper end of coaxial line coupling 413—415. A suitable termination for such use can be constructed by inserting carbon coated discs or other "lossy" or resistive dielectric masses into the coaxial at its upper end as is well known in the art. A suitable metal cap to complete the outer conductor of the coaxial line and to completely close the upper end of said line to prevent radiation therefrom should also be provided.

In Figs. 7 and 8, side and end views, respectively, of an appropriate type of band reflection filter for use in circuits of the type shown in Figs. 2 and 3, are shown. This filter is the joint invention of applicant and L. C. Tillotson and is described in detail and claimed in the copending application Serial No. 789,986, filed December 5, 1947, by the inventors, and assigned to applicant's assignee. This application has become Patent No. 2,510,288, June 6, 1950. This filter comprises a straight section of wave guide 700, preferably of the size being employed throughout the system. For example, it can be a section of wave guide having an H-plane dimension of 2.290 inches and an E-plane dimension of 1.145 inches.

Assembled within the section of guide are one or more "resonators" (three are shown by way of example) each comprising a thin rod 704 terminated at one end by a small disc 706 and firmly attached at the other end to an E-plane (shorter) wall of the guide. As shown clearly in Fig. 8 the rod of the resonator is parallel with the H-plane (longer) dimension of the wave guide, centrally located between the H-plane sides of the guide, and extends nearly across the full H-plane dimension of the guide. A screw 708, having a diameter substantially equal to the diameter of disc 706, is threaded through the E-plane wall of the wave guide just opposite the point at which rod 704 is fastened to the opposite E-plane wall. The screw is provided with a lock nut 710 to hold it in place when it has been adjusted, as described hereinunder. The free end of rod 704 can be fixed more rigidly by polystyrene studs, or by other suitable small members of insulating material, if mechanical vibration, or "warping" due to temperature changes, is found to produce objectionable variations in the adjustment of the resonator.

In accordance with the usual practice in microwave systems, a fundamental mode wave ($E_{1,0}$) with the electrical vector in the E-plane, i. e., perpendicular to the H-plane (longer) dimension of the guide, is to be employed in the illustrative systems of the invention, and such a wave will have zero coupling with rod 704 positioned, as described above, in a smooth rectangular wave guide. However, an adjustable degree of coupling between rod 704 and the wave traveling along the guide can be effected by threading one or more small screws such as screw 712 through either or both of the H-plane sides of the guide in the immediate vicinity of the rod 704. The effect of such a screw or screws (or of any irregularity of the same general character in the surface of the guide) is to distort the pattern of the wave traveling along the guide and thereby to establish a degree of coupling between the wave and rod 704 which will depend upon the degree to which the wave pattern is distorted. The distortion is of course increased as the magnitude of the irregularity is increased. Increasing the coupling effectively increases the broadness of the response of the resonant combination. A lock nut 714 is provided to hold the screw at its adjusted position.

The combination of rod 704, which contributes an inductive reactance, and disc 706 together with the inner end of screw 708 which contribute a capacitative reactance can be adjusted by turning the screw 708 in or out to increase or decrease the capacity, respectively, to cause the combination to resonate at any frequency within the range to be reflected. At the frequency of resonance and frequencies closely adjacent, above and below the resonant frequency, the resonant combination will cause reflection of the wave back in the direction from which it entered the guide while other frequencies will pass freely through the guide. As stated above, as the coupling of the rod to the wave passing through the guide is increased the broadness of response, i. e., the frequency range which will be reflected, is increased.

A "maximally flat" reflection band is approached as the number of resonators is increased, the resonators being spaced approximately one-quarter wavelength apart along the guide, and all being tuned to the median frequency of the band to be reflected.

A somewhat broader but somewhat "rippled" (instead of being flat) reflection band is obtained by tuning the additional resonant structures, (spaced one-quarter wavelength along the guide) to resonate at slightly different frequencies from the median frequency of the band or channel of frequencies to be reflected. For the system assumed by way of example above, in which bands or channels 20 megacycles wide, centered about the five different frequencies mentioned above within the region extending from 3700 to 4200 megacycles, inclusive, it has been found that a series of three resonators is sufficient to satisfactorily reflect a 20-megacycle wide channel, one resonator being adjusted to be resonant at the middle frequency of the channel and one resonator being adjusted to be resonant near each end frequency of the channel. For a more uniform degree of reflection throughout the channel additional resonators adjusted to resonate at closer frequency intervals throughout the channel can be used.

The resonators can of course comprise two rods each having a disc on its free end and connecting to directly opposite points on the E-plane walls of the guide, with provision for adjusting the spacing between the discs (presumably by threading one rod and passing it through a threaded hole in the E-plane wall to which it is connected) or any other substantially equivalent mechanical arrangement can be employed.

The effective inductance of the rod at ultrahigh and microwave frequencies is, of course, affected by its diameter as well as its length. A rod diameter of one-sixteenth inch and a disc diameter of one-quarter inch were found suitable with the system, wave guide dimensions and frequency range mentioned, by way of example, above.

Screw 708 contributes slightly to the effective inductance of the resonant combination, so that, to be extremely precise, tuning is really effected by slightly changing the inductance as well as the capacity when the screw is further inserted or is partially withdrawn from the wave guide. This effect, however, is of substantially negligible magnitude, the change in capacity resulting from adjustment of the screw, being of primary importance in fixing the resonant frequency.

A flange 702 is provided at each end of the section of wave guide 700 to facilitate joining wave guides of similar inside dimensions to the ends of this reflecting unit. Sections of the front flange are broken away in Fig. 8 to show the screws 708 and 712 and their associated lock nuts more clearly. Alternatively, round or oval wave guide sections can be employed as long as the type and orientation of wave employed presents an electric vector which is perpendicular to the rods of the resonating elements. Coupling screws in such devices should, of course, extend into the guide at right angles to the resonator rods to produce maximum coupling for a given intrusion of the screw. Where a section of guide having a round cross-section is employed the degree of coupling can be adjusted by turning the section of guide relative to the electrical vector of the wave passing through it so that the resonator rods are slightly off the true perpendicular with respect to the electrical vector. With such an arrangement no coupling screws are (obviously) necessary.

In Fig. 9 is shown the structure of one form of a complete microwave hybrid branching filter unit assembly, of the type illustrated by the schematic diagram of Fig. 2.

Units 904 are microwave hybrid junctions as illustrated in Figs. 4, 5 and 6 and described in detail above. Units 907 are reflection filters as illustrated in Figs. 7 and 8 and described in detail above. Units 900 are quarter wavelength sections (of the mid-frequency of the band to be reflected by filters 907). Unit 902 is a resistive termination of suitable impedance for balancing the P output termination of the hybrid junction. It can be of any of the forms well known to those skilled in the art. For example, it can be a short section of wave guide partially filled with energy absorbing material, such as compressed carbon particles. Alternatively, the associated members 902 and 906 can be omitted, as mentioned above, and a suitable termination as described above can then be applied directly to the coaxial line coupler of output hybrid junction 904 shown at the right of Fig. 9. A chain of assemblies of the type shown in Fig. 9, can be connected together, the output of one assembly connecting to the input of the next successive assembly, each assembly branching off a different channel or frequency band of the system, as described above in connection with the block schematic diagram of Fig. 3.

The development of additional and/or alternative filter and hybrid branching filter unit structures, will be more readily understood from the following remarks in connection with Fig. 10.

In Fig. 10, a hybrid structure 1000 is shown, having its two pairs of conjugate terminations connected as indicated. The two terminations A and B of one pair are connected by lines 1012 and 1010, respectively, to terminating impedances 1004 and 1002, respectively, the impedances being assumed, for present purposes, to be purely reactive.

In Fig. 10 the other pair of conjugate terminations connect to lines 1006 and 1008, respectively, either one of which can serve as an input and the other as an output line. Line 1006 is designated S and line 1008 is designated P to indicate that they connect to hybrid terminations which are effectively connected in series relation and in parallel relation, respectively, with reference to the other pair of conjugate terminations, A and B. This structure is of the general type described and claimed in the above-mentioned application of D. H. Ring.

Assume that a wave of frequency $f$ is introduced through line 1008. From the inherent properties of "hybrid" structures, as described in detail above, it is obvious that this wave will divide into two voltage waves each of half the power of the wave introduced through line 1008, these half power voltage waves entering lines 1010 and 1012, respectively, and traveling toward impedances 1004 and 1002, respectively. These half power voltage waves will be totally reflected by impedances 1004 and 1002 since the latter are, as mentioned above, purely reactive. The lines 1010 and 1012 and the reactances 1004 and 1002, respectively, will at the instants of reflection, have introduced effective phase changes of $\varphi_1(f)$ and $\varphi_2(f)$, respectively. (The effective change in phase resulting from the reflection at a purely reactive termination can be considered as the reflection from the end of a short-circuited transmission line of such length that the same change in phase or delay would have been introduced in the wave in travelling to the point at which the short-circuit is located.) From this point of view, then, the reactive impedance can be considered as having introduced an effective short-circuit at a discrete distance along an equivalent transmission line. Since the phase changes introduced by the reactance is a function of, i. e. varies with, frequency the reactance can be considered as "moving" the short-circuit along the line as the frequency is varied.

In traveling back to the "hybrid" the reflected waves will undergo an equal change in phase so that they will arrive back at the "hybrid" with phase changes of $2\varphi_1(f)$ and $2\varphi_2(f)$, respectively. From the characteristics of a "hybrid" structure, if the phase changes are equal, or differ by an integral number of revolutions (or cycles) i. e., if $2\varphi_1 = 2\varphi_2 \pm 2\pi n$ (or if $\varphi_1 - \varphi_2 = 0$ or $\pi n$, where $n$ is any whole number), the half power voltage waves will completely recombine in line 1008 and the circuit of Fig. 10 will be totally reflecting, i. e it will not transmit the frequency $f$.

Alternatively, if the phases $\varphi_1$ and $\varphi_2$ differ by an odd quarter number of revolutions (or cycles), i. e., if $2\varphi_1 = 2\varphi_2 \pm (2\pi n + \pi)$ $$\left(\text{or if } \varphi_1 - \varphi_2 = \pi n + \frac{\pi}{2}\right)$$

then the half power voltage waves will completely recombine in line 1006 and the circuit will be totally transmitting, i. e., it will freely and completely transmit the frequency $f$.

The following generalized equations follow readily from the above considerations:

$V_P$ (the reflected voltage) $= e^{i(\varphi_1 - \varphi_2)} \cos(\varphi_1 - \varphi_2)$ $V_S$ (the transmitted voltage) $= ie^{i(\varphi_1 + \varphi_2)} \sin(\varphi_1 - \varphi_2)$ It is apparent, therefore, that if lines 1010 and 1012 of Fig. 10 be made substantially identical (normally, they would be just sufficiently long to afford convenient connections between the hybrid structure and the impedances 1004, 1002), and purely reactive impedances 1004, 1002 be so chosen that, over frequency bands or channels to be reflected, they produce identical phase changes and that over frequency bands, or channels to be freely transmitted they produce phase changes which differ by 90 degrees, the resulting circuit of the type shown in Fig. 10 will be a frequency selective circuit of the type commonly known as a wave filter. These requirements as to phase shift correspond to the requirements for placing the poles and zeros of the series and shunt arms of a lattice structure as explained in the above-mentioned "Radio Engineers Handbook," page 239. It is therefore evident that the lattice network and the microwave "hybrid" type filter just described above are closely related and microwave hybrid structures associated with appropriately chosen microwave reactive devices, can be designed, following the classical theories and formulae developed for lattice type lumped element structures. (See above-mentioned papers of Bode, and Bode and Dietzold and the above-mentioned application of D. H. Ring.)

Furthermore, the circuit of Fig. 10 can readily be converted into an "all-pass" network, if the two reactances, 1004, 1002 are designed so that, over the entire frequency range of interest, they produce phase changes which differ by 90 degrees. The all-pass network is very readily obtained at high frequencies since all that is necessary is to make reactances 1004, 1002 identical and to make one of the lines 1010, 1012 one-quarter wavelength longer than the other.

Figure 15:
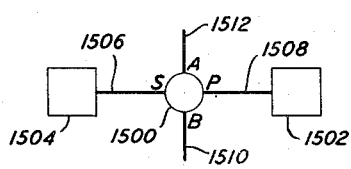
Fig. 15 illustrates, in block schematic diagram form, a variation of the arrangement of Fig. 10 which is conveniently used in constructing the very high frequency equivalent of the low frequency, lumped element, all pass, lattice type, network.

Alternatively, an equivalent arrangement is to connect the like reactances to the parallel P and series S terminations of the hybrid structure and to employ the A and B terminations for the input and output terminations of the all-pass structure. This arrangement is shown in Fig. 15 where hybrid 1500 has like reactances 1504 and 1502 connected to its S and P terminations by lines 1506 and 1508 which, in this case, can be identical in length as well as in structure, and the A and B terminations then become the input and output terminations of an all-pass structure, lines 1512 and 1510 serving to connect to terminations A and B, respectively, of the microwave hybrid structure. As in the case of all hybrid arrangements described in this application, the arrangement of Fig. 15 is valid for all frequency ranges employed in communication circuits, though the structural forms of the hybrid devices and associated elements employed will usually be vastly different for widely separated frequency regions.

It should be understood, also, that terminations P and S are usually employed as input and output terminations, or vice-versa, in nearly all structures of this invention merely from considerations of convenience, it being entirely feasible to employ terminations A and B as the input and output terminations, or vice-versa, and terminations P and S may then be used for other purposes in substantially the same manner as terminations A and B are described above as being used, taking into account the additional 90 degree phase difference introduced as is done, for example, in Fig. 15.

As mentioned above, a discrete reactance can be considered as the equivalent of a length of line having a movable short-circuit, the position of which short-circuit along the line is subject to variation with the applied frequency in a prescribed manner.

Figure 11:
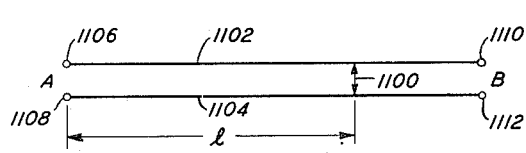
Fig. 11 shows, in schematic form a section of line with an associated movable shunt, the combination being employed in this application to explain certain underlying concepts useful in explaining the principles of the invention.

For example, consider a simple parallel wire line, a substantial number of wavelengths long. As shown in Fig. 11, the conductors 1102, 1104 extend between terminals 1106, 1108 at A and 1110, 1112 at B, respectively. A short-circuiting member 1100 is shown at point C which is a distance $l$ from terminals 1106, 1108 at A.

At frequencies at which $l$ is $$\frac{n\lambda}{2}$$

i. e. an integral number of half wavelengths, the reactance between terminals 1106, 1108 is zero, i. e. that of a short-circuit.

At frequencies at which $l$ is $$\frac{n\lambda}{2}+\frac{\lambda}{4}$$

the reactance between terminals 1106, 1108 is infinite, i. e. that of an open circuit.

This type of reactive impedance can, of course, be simulated by either a group of simple series resonant circuits connected in parallel, one of said circuits being resonant at each frequency at which the reactance is to be zero; or by a group of simple "parallel-resonant" (antiresonant) circuits connected in series, one of said antiresonant circuits becoming antiresonant at each frequency at which the reactance is to be infinite. A similar course of reactance variations could, of course, be obtained by fixing the frequency and varying the distance of the short-circuit 1100 along the line 1102, 1104.

The general theorem for the reactance of a simple smooth transmission line is, of course, $$\frac{iX}{R_0}=i\tan\frac{2\pi l}{\lambda}=i\tan\varphi$$

where $R_0$ is the characteristic impedance of the line and $l$ and $\varphi$ are expressed in terms of wavelength.

By Foster's Theorem (see the paper entitled "A Reactance Theorem" by Ronald M. Foster, Bell System Technical Journal, volume III, No. 2, April 1924, pp. 259 to 267, inclusive) between each pair of successive frequencies at which the reactance is zero (or infinite) there must be a frequency at which the reactance is infinite (or zero, respectively).

Foster also points out the substantial equivalence, for many purposes, of a two-terminal reactance comprising a plurality of series resonant structures connected in parallel with a two-terminal reactance comprising a plurality of parallel resonant (anti-resonant) structures connected in series. The question of which should be used in a particular case, can, therefore, frequently be determined on the basis of which can be more conveniently realized in physical form.

The gross character, or the integrated slope, of the phase versus frequency curve of any physically realizable, purely reactive, two-terminal network of the above-described type is determined by the location of the resonances along the frequency axis, since the difference between the values of phase at two successive resonances must be 180 degrees. Thus the general rate of increase of the curve is small if the resonances are spaced far apart and it is large if they are closely spaced.

The slope of the phase versus frequency curve of any physically realizable, purely reactive, two-terminal network, or line, must, also, always be positive.

Furthermore, the slope at any particular frequency is adjustable to a very large degree, by adjusting the slope at the adjacent frequencies at which resonance occurs, i. e. the resonant frequencies between which the particular frequency is located. A very small slope (i. e. a slow change of phase with frequency) can be produced by means of a broad resonance. A very large slope (i. e. a rapid change of phase with frequency) can be produced by means of a sharp resonance. Any intermediate slope of the phase versus frequency curve can be produced by means of a resonance of appropriate intermediate width.

Figure 12:
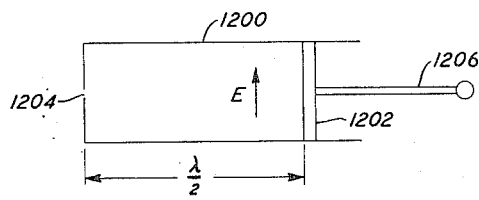
Fig. 12 illustrates, in diagrammatic form, a simple resonant cavity of a type suitable for use in constructing, at very high frequencies, the equivalent of low frequency, lumped element, two-terminal reactances, of any desired complexity.

In Fig. 12 a structure is shown which provides, at very high frequencies, the approximate equivalent of a low frequency lumped element simple antiresonant (paralleled coil and condenser) combination. It comprises a section of wave guide, 1200, closed at one end by a movable piston-like member 1202, provided with a handle 1206 for purposes of adjustment and provided with an iris at the other end by which it can be coupled to another wave guide, as illustrated, for example, in Figs. 13 and 14 described hereinunder.

As a roughly approximate analogy, it can be stated that the "inductance" of the element of Fig. 12 is contributed by the length of wave guide between the iris 1204 and the closure 1202 (which length is usually adjusted in such structures to substantially a half wavelength) and that the iris 1204 contributes the capacitive portion of the approximately equivalent lumped element antiresonant combination. (Actually, of course, the iris, depending upon its size, shape, thickness and position can, as is well known to those skilled in the art, contribute also to the inductive portion of the combination.) The size of the iris controls the broadness of the resonance, a small iris producing a sharp resonance, the broadness of the resonance being increased as the dimensions of the iris are increased. Throughout the frequency range of the illustrative system described above, the iris for resonant elements of the type illustrated in Fig. 12 can conveniently be made of $\frac{1}{16}$ inch sheet brass and a slit substantially as long as the transverse dimension of the wave guide side to which the cavity is affixed and about $\frac{3}{32}$ inch wide can initially be provided as the iris. The slit is, thereafter, enlarged gradually and the electrical characteristics of the device measured at intervals, until the desired broadness of resonance is achieved. An accurately adjusted resonant cavity is thus obtained, with a resonable amount of effort.

Figure 13:
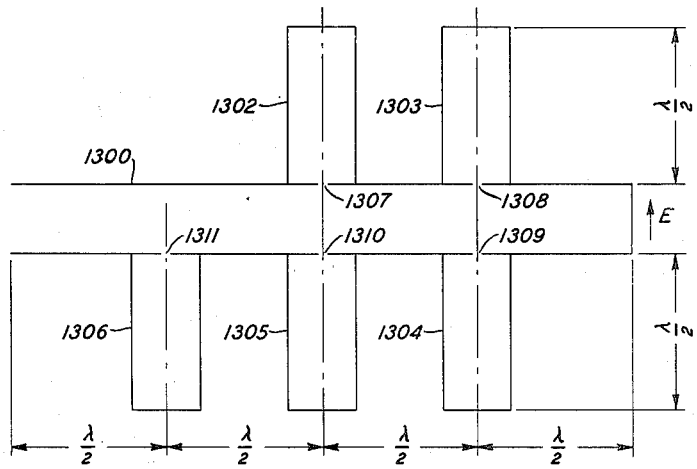
Figs. 13 and 14 illustrate two ways of combining a plurality of simple unit structures of the type illustrated in Fig. 12, to obtain very high frequency and/or microwave equivalents of complex low frequency, lumped element, two-terminal reactances, of any desired degree of complexity.

In Fig. 13, a wave guide structure is shown, constituting at very high frequencies, the approximate equivalent of the low frequency circuit consisting of a number of simple lumped element antiresonant (coil and condenser in parallel) combinations connected in series.

In Fig. 13, five resonant cavities 1302 to 1306, inclusive, having irises 1307 to 1311, inclusive, respectively, are shown coupled through said irises to the H-plane sides of wave guide 1300. The cavities are spaced at half wavelength distances along the wave guide. The right end of guide 1300 is closed at a point one-half wavelength from the center line of the nearer cavities 1303 and 1304. The left end of guide 1300 is open and terminates at a distance of one-half wavelength from the center line of the nearest cavity 1306.

Cavities 1302 to 1306, inclusive, are of the type illustrated and described in connection with Fig. 12 and are each adjusted, as described above, to a predetermined antiresonant frequency and broadness of resonance. After adjustment the handle 1204 and any excess length are removed and the end 1202 is permanently soldered or welded in its proper position.

As there are five cavities, the structure of Fig. 13 provides the high frequency equivalent of five antiresonant combinations connected electrically in series. Any different number of cavities can be used as long as the spacings prescribed are adhered to and one antiresonance will be provided by each cavity used.

Where only one cavity is to be used it can connect directly on the end of the wave guide 1300.

If desired for mechanical convenience, two or more cavities can all be placed along a common side of the guide, i. e. for a three-cavity resonator cavities 1302 and 1303 can be omitted and their irises closed. Alternatively an even number of cavities (and antiresonances) can be provided by a structure in which the cavities are paired and placed on opposite sides of the guide. For example for a two cavity structure cavities 1302, 1305 and 1306 of Fig. 13 can be omitted and wave guide 1300 can be terminated at one-half wavelength to the left of the common center line of cavities 1303 and 1304.

Figure 14:
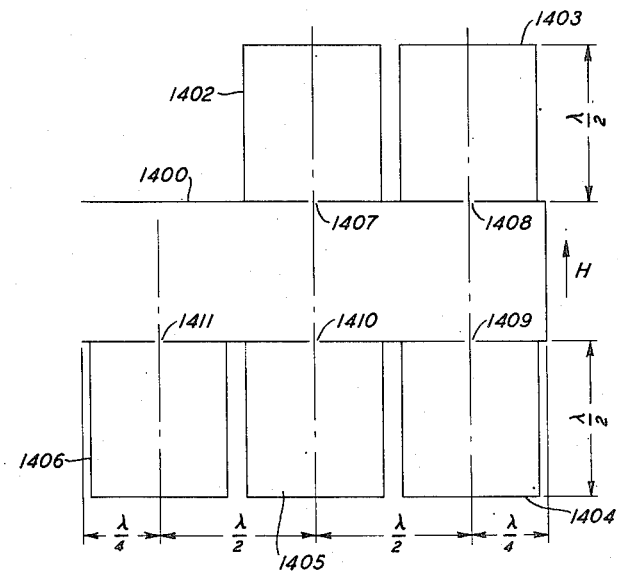

Fig. 14 is generally similar to Fig. 13 except that the cavities 1402 to 1406, inclusive, are connected through irises 1407 to 1411, inclusive, respectively, to wave guide 1400 along the E-plane sides of the guide. In general the irises of the cavities of both Figs. 13 and 14 will be slit-like openings perpendicularly positioned with respect to the longitudinal axis of the wave guide on which the cavities are mounted. Specially shaped and tuned irises can, of course, be employed to meet specific desired requirements in accordance with principles well known to those skilled in the art.

In Fig. 14 the end cavities are spaced one-quarter wavelength from the ends of the wave guide 1400, but adjacent cavities are spaced one-half wavelength apart center to center, as shown in Fig. 14. This structure is the high frequency equivalent of five low frequency, series resonant, lumped element (coil and condenser in series), combinations, connected in parallel. Any number of cavities required, to provide a particular desired "two-terminal" reactance characteristic, can be used in the structure of Fig. 14, substantially in the same way as was pointed out in connection with Fig. 13, with the exception of the above-described difference in end-to-first-cavities spacings.

Figure 16:
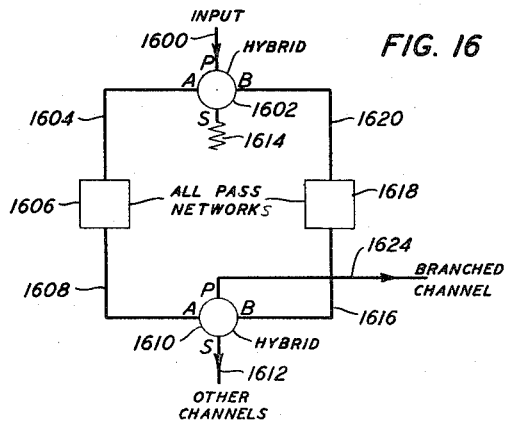
Fig. 16 illustrates, in block schematic diagram form, a hybrid branching type of circuit, employing all pass structures, which can be used in place of the arrangement illustrated by Fig. 2.

In Fig. 16 a schematic diagram of an alternative arrangement, with respect to that of Fig. 2, of hybrid branching filter units of the invention is shown. The arrangement of Fig. 16 employs frequency versus phase discriminative networks of the all-pass type 1606, 1618, in place of the reflecting filters used in Fig. 2. The selected channel is branched from the second hybrid 1610 and the S termination of hybrid 1602 is terminated in matching impedance 1614.

In the circuit of Fig. 16 all channels of the system (for example the five channels of the illustrative system described above) are introduced into the P termination of hybrid 1602 by transmission line 1600 and pass freely through both all-pass networks 1606, 1618. Also the connecting lines 1604, 1608 on the left of Fig. 16 are substantially identical in construction and total length with the connecting lines 1616, 1620 on the right of Fig. 16.

One frequency band or channel is, however, caused to branch off from the others at the second hybrid 1610, by virtue of a phase difference, between the channel to be branched and all the other channels, of 180 degrees introduced throughout that channel only, by the all-pass networks 1606 and 1618. This phase difference can either be introduced with respect to the single band or channel of frequencies to be branched off only, or it can be introduced with respect to all the other channels which are not to be branched off, only.

Expressed in other words, if the channel of frequencies to be branched off experiences 180 degrees more phase shift in passing through all-pass network 1606 than in passing through all-pass network 1618, and the other channels experience identical phase shifts in passing through either of the all-pass networks, then the branched channel frequencies will clearly appear in the opposite hybrid output termination of hybrid 1610 from that in which the other channels will appear.

Conversely, if all channels but the one to be branched off experience a phase shift of 180 degrees more in one of the all-pass networks 1606, 1618 than in the other, and the channel to be branched experiences the same phase shift in passing through either network, then, again, the single channel to be branched off will clearly appear at the opposite output termination of hybrid 1610 than will all the other channels. This latter case is the one illustrated by Fig. 16.

Figure 17:
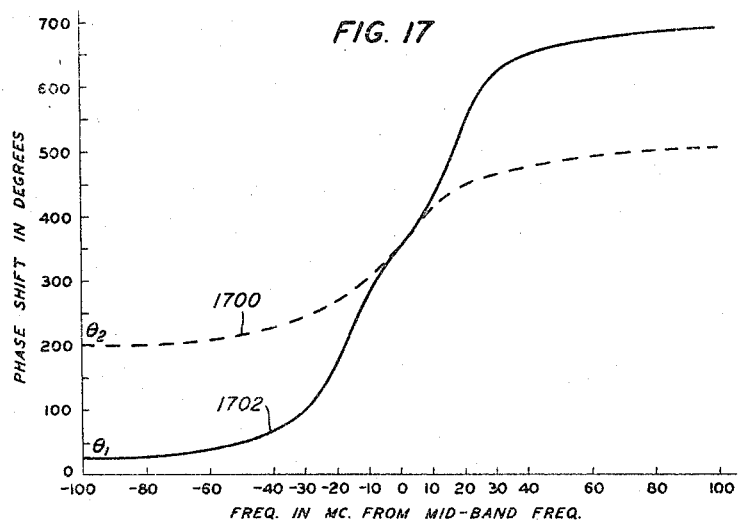
Fig. 17 illustrates one type of phase versus frequency curves which the all pass networks of Fig. 16 can have to effect the branching off of one of a plurality of channels of a microwave system.

This latter case is also illustrated by the phase versus frequency curves of Fig. 17, in which, by way of example, curve 1702 can be the phase versus frequency characteristic of network 1606 and curve 1700 can be the phase versus frequency characteristic of network 1618.

In Fig. 17, the frequency scale indicates megacycles above or below the mid-band of the frequency channel to be branched off, the mid-frequency being designated zero. As in the illustrative system, assumed in connection with Fig. 1, if it is desired to branch off a channel 20 megacycles wide (i. e. from +10 to −10 about mid-band frequency), then it is apparent that the phase versus frequency curves 1700, 1702 of all-pass networks 1606, 1618, respectively, are to be substantially identical over the band, but that at adjacent bands (spaced 80 megacycles between mid-band frequencies) phase versus frequency curves 1700, 1702, are to be substantially 180 degrees apart. The curves 1700 and 1702 of Fig. 17, obviously, meet these requirements.

Figure 18:
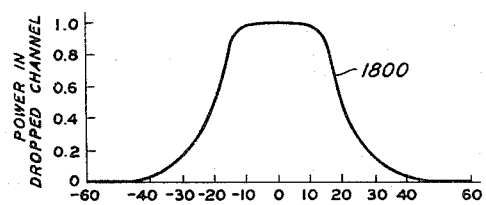
Fig. 18 illustrates the power versus frequency characteristic, throughout the branched channel, of the hybrid branching filter of Fig. 16.

In Fig. 18, curve 1800 represents the power output of the branched channel versus frequency for the circuit of Fig. 16 when the all-pass networks 1606, 1618 have phase versus frequency characteristics 1700, 1702 of Fig. 17, respectively. The ordinates of this curve represent proportion of power input appearing in the branched channel output.

All-pass networks 1606 and 1618 can, for the illustrative system assumed above, be of the type illustrated in Fig. 15 and described in detail above. Alternatively, they can be of the type illustrated in Fig. 10 and described above, in which one of the lines 1010, 1012 is one-quarter wavelength longer than the other. At lower frequencies equivalent coaxial line structures or paired wire structures with coaxial line or lumped element reactive structures can be employed in accordance with the principles of the invention to produce the equivalent results.

For an all-pass network, as explained above, reactances 1004, 1002 of Fig. 10, or 1504, 1502 of Fig. 15 should be identical for each network.

One network 1606 of Fig. 16 which is, in accordance with the above description, to have the phase versus frequency characteristic indicated by curve 1700 of Fig. 17 can have identical reactances of the type illustrated and described in detail in connection with Fig. 12, above, adjusted to resonance at the mid-frequency of the band to be branched off and tuned, by adjusting the irises, as described above, to provide a broad resonance.

The other network 1618 of Fig. 16, which is to have the phase versus frequency characteristic indicated by curve 1702 of Fig. 17, can have identical reactances of the type illustrated and described in detail above in connection with Fig. 13 except that only two resonant cavities are required for each reactance, i. e. cavities 1302, 1305 and 1306 of Fig. 13 can be omitted and their iris openings into the guide closed and wave guide 1300 can be shortened so that its open end is one-half wavelength to the left from the longitudinal center line of cavities 1303 and 1304 of Fig. 13. For each reactance of network 1618, one cavity is to be tuned to a frequency 20 megacycles lower than the mid-band frequency of the channel to be branched off and the other cavity is to be tuned to a frequency 20 megacycles higher than the said mid-band frequency, the irises of both of these cavities being adjusted to provide a sharper resonance than for the single cavity reactances of network 1606. Assuming an equivalent lumped element circuit, i. e. one in which resonant circuits formed by coils and condensers having discrete values of inductance L and capacity C and designed for use with a transmission line having a characteristic impedance $R_0$; the broadness of resonance of the single cavity reactances of network 1606 should be substantially that required by the relation $$\frac{1}{R_0}\sqrt{\frac{L}{C}}=100$$

while the broadness of resonance of each cavity of the double cavity reactances of network 1618 should be substantially that required by the relation $$\frac{1}{R_0}\sqrt{\frac{L}{C}}=200$$

Figure 19:
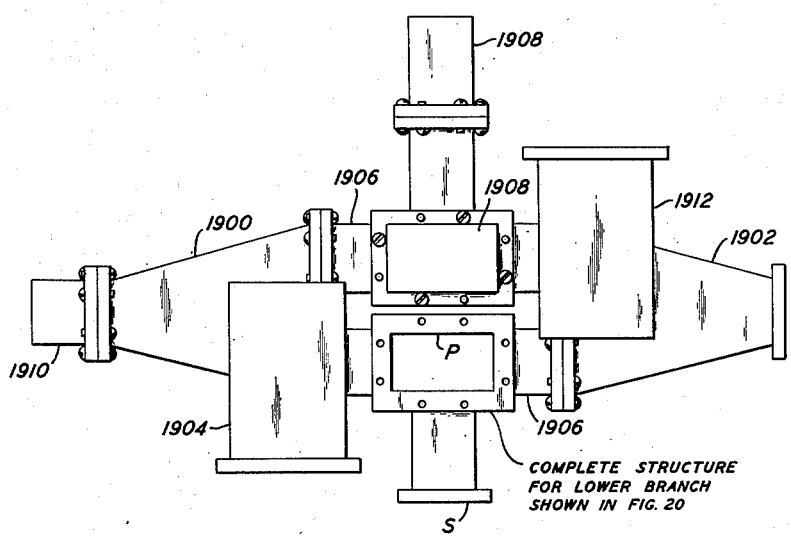
Figs. 19 and 20, taken together, show the physical structure of a form of microwave hybrid branching filter unit of the general type illustrated by the schematic diagram of Fig. 16.
Figure 20:
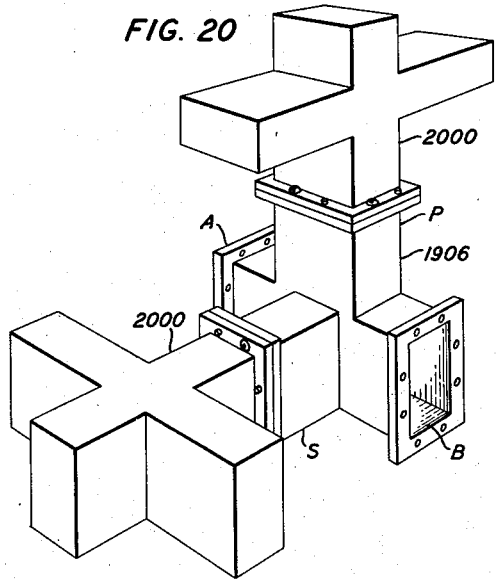

Figs. 19 and 20, taken together, illustrate the physical structure of one form of hybrid branching filter unit employing phase versus frequency discriminating devices as illustrated in block schematic diagram form by Fig. 16 and in which the phasing devices employed have the characteristics shown in Fig. 17, as described above.

In Fig. 19 devices 1900 and 1902 can be hybrid branching structures of the type illustrated in Figs. 4, 5 and 6 and described in detail above.

Devices 1906 are wave guide junctions of the well known "magic T" type with their A terminations connecting to the A and B terminations of device 1900 and their B terminations connecting to the A and B terminations of device 1902, respectively as shown in Fig. 19. The detailed construction of the device 1906 can be seen more clearly in Fig. 20. Throughout Figs. 19 and 20 flanges are provided, at each termination of the wave guide structures employed, to facilitate connecting them together and to appropriate input and output wave guide transmission lines.

In Fig. 19, the S termination of device 1900 is terminated in its own impedance by dissipative termination 1910. All channels of the system are introduced (by way of example) into the P termination of device 1900 through member 1904.

The P and S terminations of the upper "magic T" device 1906 of Fig. 19 are terminated in like single cavity resonant devices 1908 of the type illustrated by Fig. 12, as described in detail above, and adjusted to resonate broadly at the mid-frequency of the channel to be branched off, as is also discussed in detail above.

The lower "magic T" device 1906 of Figs. 19 and 20 has its P and S terminations connected to like, two-cavity, resonant devices as shown in Fig. 20. The terminating, two-cavity, resonant devices are not shown in Fig. 19 on the lower device 1906, as they would tend to obscure other details of the assembly of that figure, but it is to be understood that the lower device is provided with them as shown clearly in the separate Figure 20. The two-cavity resonant devices 2000 can be of the type illustrated by Fig. 13 described in detail above with cavities 1302, 1305 and 1306 of Fig. 13 omitted and the wave guide 1300 shortened to extend one-half wavelength of the midband frequency of the channel or frequency band to be segregated, or branched off, from the other channels of the system. As described in detail above one cavity of each of the devices 2000 is adjusted to resonate at 20 megacycles below and the other at 20 megacycles above the midband frequency of the channel to be branched off, the resonances of these cavities to be sharper than that of the single cavities 1906, as described in detail above.

For wave guide structures of the H-plane and E-plane dimensions, assumed for purposes of illustration above, the S arms of hybrid T structures 1906 should be approximately 2.09 inches long and the P arms approximately 2.54 inches long in order to obtain good impedances at these terminations and to obtain the additional 90° phase shift in the arm P with respect to the phase shift in arm S.

The phase versus frequency curves of the two wave guide circuit structures including devices 1906 (connecting devices 1900 and 1902) will then be as illustrated by curves 1700 and 1702, respectively, of Fig. 17. All channels of the multichannel system can be introduced into member 1904 and the channel to be branched off, will appear in member 1912 connected by coaxial coupling to the P termination of device 1902. The other channels will appear at the S termination of device 1902. The detailed explanations for all these phenomena are, of course, those given above in connection with the discussion of Figs. 10 to 17, inclusive. Again a chain of assemblies such as are illustrated by Figs. 19 and 20 can be employed, the output of each assembly connecting to the input of the next successive assembly.

Incidentally, while the over-all assembly of Figs. 19 and 20 suffices to adequately illustrate the principles of the invention, it might prove somewhat awkward mechanically to have to connect the output termination at the small end of member 1902 of one assembly to the termination, corresponding to input termination 1904 of Fig. 19 of the next successive assembly. This can readily be remedied by inserting an additional 180-degree phase shift in one of the two transmission paths connecting hybrid structures 1900 and 1902. The desired additional phase shift is very easily realized by simply inserting a quarter wave section of wave guide between each of the reactive devices 1906 and the terminations of the hybrid junction 1900 to which they are connected. Having done this terminating impedance 1910 can then be transferred to terminate member 1904 and the termination at the small end of junction 1900 can be used as the input junction into which all channels of the system are introduced. Because of the additional 180 degrees introduced in one transmission path to junction 1902, as described above, the branched channel will still appear in member 1912 and the remaining unbranched channels will still appear in the termination at the small end of junction 1902. A chain of assemblies then would appear very similar to a chain of the assemblies of the type shown in Fig. 9 except for the more complex structures used to connect the input and output hybrid junctions of each assembly.

Numerous and various other arrangements within the spirit and scope of the principles of the invention will occur to those skilled in the art. The general principles of the invention are, for example, readily applicable to systems employing compressional wave energy as well as electromagnetic wave energy.

The scope of this invention is defined in the following claims.

What is claimed is:

1. In a multichannel microwave electrical transmission system for transmitting a broad microwave frequency region, an input microwave hybrid structure and an output microwave hybrid structure, a first and a second microwave transmission path connecting conjugate connection points of said input and said output hybrid structures respectively, each of said transmission paths comprising serially in tandem connection a first section of microwave transmission line, a reflection filter reflecting a portion only of said broad microwave frequency region and freely transmitting the remainder of said region, and a second section of microwave transmission line, the first section of transmission line of said first path exceeding in electrical length the first section of transmission line of said second path by one-quarter wavelength of the median frequency of the reflected portion of said broad microwave frequency region, the second section of transmission line of said second path exceeding in electrical length the second section of transmission line of said first path by one-quarter wavelength of said median frequency the reflection filters of said two paths being relatively identical whereby the reflected portion of said frequency region in said first path arrives back at said input hybrid structure with a change of 180 degrees in relative phase with respect to the reflected portion of said frequency region arriving back at said input hybrid in said second path but the freely transmitted frequencies in both paths arrive at said output hybrid structure without change in their relative phase.

2. A channel branching filter for a multichannel microwave electrical transmission system which comprises in combination an input and an output microwave hybrid structure, a first and a second microwave transmission path, each of said paths comprising in tandem a first section of wave guide connecting to the input hybrid structure, a narrow band reflection filter the input of said filter connecting to said first section of wave guide and a second section of wave guide connecting the output of said reflection filter to said output hybrid structure, the length of the first section of wave guide of said first microwave transmission path exceeding the length of the first section of wave guide of said second microwave transmission path by one-quarter wavelength of the mid-frequency of the frequency band reflected by said band reflection filter, the length of said second section of wave guide of said first microwave path being less than the second section of wave guide of said second microwave path by one-quarter wavelength of said mid-frequency, the band reflection filters of said first and second microwave paths being identical, the two transmission paths connecting at each hybrid to terminations of said hybrid which are conjugately related.

3. The method of effecting the segregation of a first portion of the channels of a multichannel microwave transmission system from a second portion of the channels of said system which comprises equally dividing the energy of all channels to flow in two conjugately related transmission paths, preserving the relative phase relation of the energy of said first portion of said channels in both paths, altering the relative phase relation of the energy of said second portion of said channels in one path by substantially 180 degrees with respect to said energy in the second path, recombining the energy of both portions of said channels in conjugately related arms of hybrid transmission structures whereby the said first portion of said channels is directed to a first output terminal of said hybrid structure and the said second portion of said channels is directed to a second output terminal of said structure.

4. A microwave hybrid branching filter for use in a multichannel microwave transmission system which comprises a first microwave hybrid structure, a second microwave hybrid structure, a first microwave transmission path and a second microwave transmission path, said paths connecting a pair of conjugate terminals of said first hybrid structure with a pair of like terminals of said second hybrid structure, respectively, each of said paths comprising a first section of microwave transmission line, a single channel microwave reflecting filter and a second section of microwave transmission line, said first section of line connecting said first hybrid structure to the input of said reflecting filter, the said second section of said line connecting the output of said reflecting filter to said second hybrid structure, the first transmission line of one of said paths exceeding in electrical length the first section of said other path by one-quarter wavelength of the mid-frequency of the single channel reflected by said reflecting filters, the second section of transmission line of said other path exceeding in electrical length the second section of transmission line of said first-mentioned path by one-quarter wavelength of said mid-frequency, whereby the channel reflected by said reflecting filters will appear at the terminal conjugately related to the input terminal of said first hybrid structure and the other channels passed by said reflecting filters will all appear at an output terminal of said second hybrid structure.

5. In a multichannel microwave transmission system a microwave hybrid branching filter comprising in combination a first hybrid microwave structure and a second hybrid microwave structure, each said structure having two pairs of conjugately related connection points, a first microwave transmission path connecting one connection point of said first hybrid structure to a connection point of said second hybrid structure, a second microwave transmission path connecting the connection point of said first hybrid structure, which is conjugate to the point of said first hybrid structure connected to said first transmission path, to the connection point of said second hybrid structure the last-stated connection point being conjugately related to the connection point of said second hybrid structure connected to said first transmission path, each of said transmission paths comprising identical reflection structures reflecting at least one channel of the total number of channels employed in said microwave transmission system and freely passing the channels not reflected, a first section of microwave transmission line, in each transmission path, connecting said first hybrid structure to said reflection structure and a second section of microwave transmission line connecting said reflection structure to said second hybrid structure, the said first section of transmission line of said first transmission path exceeding in electrical length the first section of transmission line of said second transmission path by one-quarter wavelength of the median frequency of the frequency range reflected, the said second section of transmission line of said first transmission path being shorter in electrical length than the second section of transmission line of said second transmission path by one-quarter wavelength of said median frequency.

6. An electrical microwave hybrid branching filter for use in a multichannel electrical microwave transmission system, said branching filter comprising in combination, a first microwave hybrid structure adapted to divide the energy of all channels of said system between two conjugately related output terminals of said hybrid structure when said energy is introduced into a particular input terminal of said hybrid structure, a pair of microwave transmission paths connecting to said two output terminals of said hybrid structure, respectively, a second microwave hybrid structure having two conjugately related input terminals said input terminals being connected to said pair of transmission paths, respectively, said pair of transmission paths serving to transmit a portion only of said channels of said system from said first hybrid structure to said second hybrid structure without altering the relative phase of said portion of said channels, said transmission paths serving to present the remainder of said channels to one of said hybrid structures with an alteration in the phase of the energy of said remainder of said channels in one of said paths of 180 degrees with respect to the energy of said remainder of said channels in said other path, whereby said first-mentioned portion of said channels and said remainder of said channels will appear at different hybrid structure output terminals.

7. In a microwave transmission system a pair of wave guide hybrid junctions each having at least two pairs of conjugately related terminals, a pair of substantially identical wave guide transmission circuits connecting the individual terminals of one pair of conjugately related terminals of one of said junctions to the individual terminals of one pair of conjugately related terminals of the other of said junctions, respectively, each of said pair of wave guide transmission circuits including a reflecting structure in said circuit, the reflecting structures in said pair of circuits being substantially identical and being located substantially one-quarter wavelength of the median frequency of the frequency band of primary interest nearer one end of each of said wave guide circuits than the other end, said wave guide circuits being connected between said junctions with the reflecting structure in one circuit said one-quarter wavelength nearer one of said junctions than the reflecting structure of the other of said circuits is with respect to the same junction, whereby when microwave energy is introduced into a third terminal of said same junction reflections thereof from the said reflecting structures in each of said transmission circuits will arrive back at said same junction displaced 180 degrees in phase with respect to each other and will therefore be transmitted to a fourth terminal of said same junction and no reflected energy will appear at said third terminal.

8. In a system for the transmission of microwave energy, a pair of wave guide hybrid junctions each having at least two pairs of conjugately related terminals, a pair of substantially identical wave guide transmission circuits connecting the individual terminals of one pair of conjugately related terminals of one of said junctions to the individual terminals of one pair of conjugately related terminals of the other of said junctions, respectively, a microwave structure included in each of said pair of transmission circuits adapted both to reflect and to transmit portions of said microwave energy, said structures in said pair of circuits being substantially identical and being located substantially one-quarter wavelength of the median frequency of said microwave energy nearer one end of each of said wave guide circuits than the other end, said wave guide circuits being connected between said junctions with said structure in one circuit said quarter wavelength nearer one of said junctions than the structure of the other of said circuits is with respect to the same junction, said circuits thereby being adapted to return each of said reflected portions of said energy to said same junction displaced 180 degrees in phase with respect to each other and to pass each of said transmitted portions to said other junction substantially in phase with respect to each other.

9. In an electrical guided wave transmission system, means for selectively transmitting different portions of a broad frequency band of microwave energy comprising, in combination, first and second wave guide hybrid junctions, each of said junctions having two pairs of terminations, the terminations of each pair being conjugately related to each other, a pair of wave guide transmission structures each of said structures being connected between a termination of one hybrid junction and a termination of the other hybrid junction, the terminations so connected at each junction comprising one of the said conjugately related pairs of terminations of said junction, said wave guide transmission structures having predetermined transmission characteristics correlated with respect to each other over the said broad frequency band of microwave energy whereby a portion of said band will appear at a different termination of one of said hybrid junctions than the remainder of said band when the entire band is introduced into a predetermined input termination of one of said hybrid junctions, none of said energy being reflected back to said predetermined input termination.

10. In an electrical guided wave transmission system, the combination which comprises first and second wave guide hybrid junctions, each of said junctions having two pairs of terminations, the terminations of each pair being conjugately related to each other, a pair of wave guide structures said structures respectively connecting the terminations of one pair of terminations of said first junction to the terminations of one pair of terminations of said second junction, each of said structures comprising in tandem relation a first portion of wave guide, a wave guide transducer having a predetermined transmission versus frequency characteristic and a second portion of wave guide, said first portion of wave guide of one of said structures being a quarter wavelength longer than the first portion of wave guide of said other structure, the second portion of wave guide of said one of said structures being a quarter wavelength shorter than the second portion of wave guide of said other structure.

11. In an electrical guided wave transmission system, the combination which comprises first and second wave guide hybrid junctions, each of said junctions having two pairs of terminations, the terminations of each pair being conjugately related to each other, and a pair of wave guide structures interconnecting, respectively, the two terminations of one of said pairs of terminations of said first junction to the two terminations of one of said pairs of terminations of said second junction, said pair of wave guide structures having phase characteristics which differ by 180 degrees in relative phase over a portion of the entire frequency range of interest with respect to their relative phase over the remainder of said entire frequency range.

WILLARD D. LEWIS.

REFERENCES CITED

The following references are of record in the file of this patent:

UNITED STATES PATENTS

| Number | Name | Date |
|---|---|---|
| 2,194,543 | Curtis | Mar. 26, 1940 |
| 2,401,751 | Friis | June 11, 1946 |
| 2,408,033 | Beck | Sept. 24, 1946 |
| 2,410,838 | Ring | Nov. 12, 1946 |
| 2,416,790 | Barrow | Mar. 4, 1947 |
| 2,432,093 | Fox | Dec. 9, 1947 |
| 2,434,646 | Fox | Jan. 20, 1948 |
| 2,438,913 | Hansen | Apr. 6, 1948 |
| 2,445,895 | Tyrrell | July 27, 1948 |